United States Patent
Xu

(10) Patent No.: US 11,242,868 B2
(45) Date of Patent: Feb. 8, 2022

(54) AXIAL FAN

(71) Applicant: Zhongshan Yibisi Technology Co., Ltd., Zhongshan (CN)

(72) Inventor: Haiming Xu, Zhongshan (CN)

(73) Assignee: ZHONGSHAN YIBISI TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 15/931,539

(22) Filed: May 13, 2020

(65) Prior Publication Data

US 2020/0271133 A1   Aug. 27, 2020

Related U.S. Application Data

(63) Continuation-in-part of application No. PCT/CN2018/103757, filed on Sep. 3, 2018.

(30) Foreign Application Priority Data

Apr. 17, 2018   (CN) .......................... 201820546450.4

(51) Int. Cl.
*F04D 29/70* (2006.01)
*F04D 19/00* (2006.01)
(Continued)

(52) U.S. Cl.
CPC ......... *F04D 29/703* (2013.01); *F04D 19/002* (2013.01); *F04D 25/0613* (2013.01);
(Continued)

(58) Field of Classification Search
CPC .... F04D 19/002; F04D 25/06; F04D 25/0613; F04D 29/522; F04D 29/703;
(Continued)

(56) References Cited

U.S. PATENT DOCUMENTS 5,131,352 A * 7/1992 Hoshino .................... F01P 5/06
                                                    123/41.49
5,312,230 A * 5/1994 Oda ....................... F04D 29/384
                                                    415/119
(Continued)

FOREIGN PATENT DOCUMENTS

CN      201425039 Y      3/2010
CN      203560117 U      4/2014
(Continued)

OTHER PUBLICATIONS

Sysadm, About the Author: "Is Epoxy Resin Plastic." Custom Materials Inc., Sep. 24, 2020, custommaterials.com/is-epoxy-resin-plastic/#:~:text=Yes%2C%20epoxy%20resin%20is%20a%20form%20of%20plastic.,of%20polymer%20chains%20that%20are%20linked%20together%20physically. (Year: 2020).*

*Primary Examiner* — Devon C Kramer
*Assistant Examiner* — Joseph S. Herrmann
(74) *Attorney, Agent, or Firm* — Matthias Scholl P.C.; Matthias Scholl

(57) ABSTRACT

An axial fan, including: a wind deflector including a cavity; a motor; a plurality of blades circumferentially disposed on the motor; and a grid mesh disposed on one end face of the wind deflector. The motor and the plurality of blades are disposed in the cavity. The grid mesh includes a central part provided with a fixed platform. The motor is disposed on the fixed platform.

5 Claims, 5 Drawing Sheets

(51) Int. Cl.
*F04D 29/52* (2006.01)
*F04D 25/06* (2006.01)

(52) U.S. Cl.
CPC ........ *F04D 29/522* (2013.01); *F05D 2230/21* (2013.01); *F05D 2240/14* (2013.01)

(58) Field of Classification Search
CPC .. F04D 29/541; F04D 29/542; F05D 2240/14; F05D 2230/21
See application file for complete search history.

(56) References Cited

U.S. PATENT DOCUMENTS

| | | | |
|---|---|---|---|
| 6,359,354 B1* | 3/2002 | Watanabe | H02K 5/08 310/154.45 |
| 8,087,882 B2* | 1/2012 | Xu | F04D 29/703 415/121.2 |
| 2008/0213103 A1 | 9/2008 | Miyakoda et al. | |
| 2009/0180877 A1* | 7/2009 | Lin | F04D 29/601 416/62 |
| 2014/0154095 A1* | 6/2014 | Gonz | F24F 1/38 416/247 R |
| 2016/0097548 A1* | 4/2016 | Wang | F04D 29/668 62/507 |

FOREIGN PATENT DOCUMENTS

| | | |
|---|---|---|
| CN | 204061236 U | 12/2014 |
| CN | 204733056 U | 10/2015 |

* cited by examiner

AXIAL FAN

CROSS-REFERENCE TO RELATED APPLICATIONS

This application is a continuation-in-part of International Patent Application No. PCT/CN2018/103757 with an international filing date of Sep. 3, 2018, designating the United States, now pending, and further claims foreign priority benefits to Chinese Patent Application No. 201820546450.4 filed Apr. 17, 2018. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to an axial fan.

Conventionally, as shown in FIG. 1, an axial fan for vehicle air conditioners includes a motor a, a plurality of blades b, a wind deflector c and a gird mesh d. The wind deflector c has a cavity e, and the gird mesh d is disposed on one side of the wind deflector c. The wind deflector c comprises a protruded support f. The motor a is fixed on the protruded support f and disposed in the cavity e. The axial fan comprising the protruded support f is bulky.

SUMMARY

The disclosure provides an axial fan.

The axial fan comprises a wind deflector comprising a cavity; a motor; a plurality of blades circumferentially disposed on the motor; and a grid mesh disposed on one end face of the wind deflector. The motor and the plurality of blades are disposed in the cavity; and the grid mesh comprises a central part provided with a fixed platform, and the motor is disposed on the fixed platform.

The motor comprises a shaft, a bearing, a plastic encapsulated stator and an outer rotor; the plastic encapsulated stator comprises a sleeve seat; the shaft is disposed on the sleeve seat via the bearing; the outer rotor is disposed outside the plastic encapsulated stator; the outer rotor comprises a casing and a permanent magnet disposed in the casing; one end of the shaft extends out of the sleeve seat and is connected to the casing, and the plurality of blades is circumferentially disposed on the casing.

The plurality of blades is integrated with the casing through injection molding.

The plastic encapsulated stator comprises an end face provided with a plurality of screw holes; the fixed platform comprises a plurality of mounting holes matching the plurality of screw holes, respectively; a plurality of bolts respectively passes through the plurality of mounting holes and the plurality of screw holes to fix the motor on the fixed platform.

The grid mesh further comprises a plurality of annular bars and a plurality of connection ribs; the grid mesh covers an air outlet on the one end face of the wind deflector and is integrated with the wind deflector through injection molding; the plurality of annular bars arranges to form a plurality of concentric circles surrounding the fixed platform; every two adjacent concentric circles are connected to each other by the plurality of connection ribs; one end of each of the plurality of connection ribs is connected to the wind deflector, and another end of each of the plurality of connection ribs is connected to the fixed platform; adjacent annular bars and adjacent connection ribs form a plurality of ventilation slots.

The fixed platform is circular, and a diameter of the fixed platform is larger than that of the casing.

The plurality of mounting holes is tapped holes.

The disclosure also provides a vehicle comprising the axial fan.

Advantages of the axial fan according to embodiments of the disclosure are summarized as follows:

1) the motor is directly disposed on the grid mesh, compared with conventional axial fan having a support, the thickness and volume of the axial fan are reduced;

2) the end face of the motor is disposed on the fixed platform, weakening the penetration of water into the motor;

3) the plurality of blades is circumferentially disposed on the casing, which diminishes the thickness and volume of the axial fan;

4) the plurality of blades is integrated with the casing through injection molding, improving the assembly efficiency;

5) the motor is fixed on the fixed platform via the bolts, facilitating the installation;

6) a plurality of ventilation slots is disposed on the gird mesh, improving the ventilation efficiency; and 7) the diameter of the fixed platform is larger than that of the casing, which can effectively protect the motor.

DETAILED DESCRIPTION

To further illustrate, embodiments detailing an axial fan are described below. It should be noted that the following embodiments are intended to describe and not to limit the disclosure.

Figure 1:
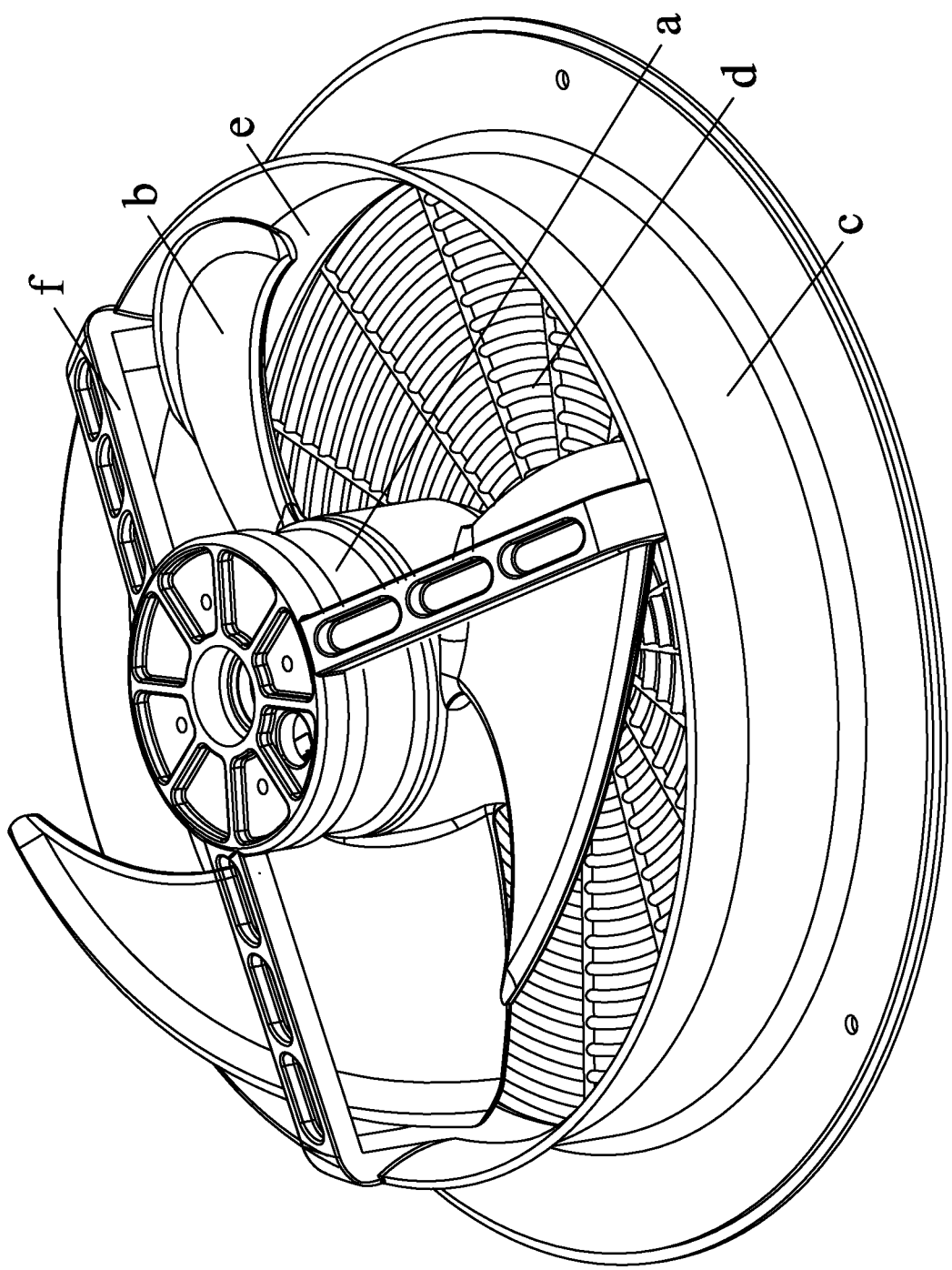
FIG. 1 is a schematic diagram of an axial fan in the prior art.
Figure 2:
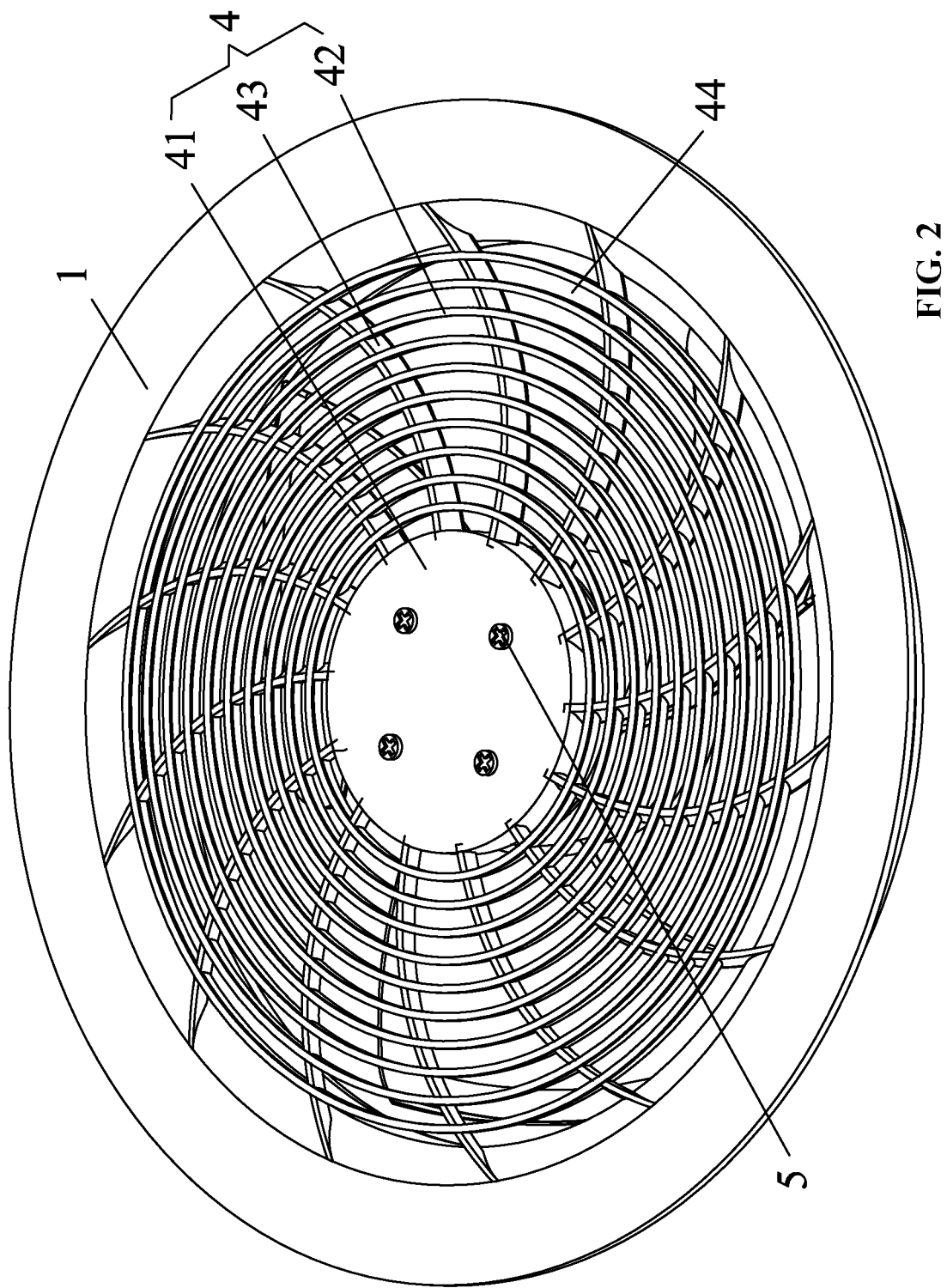
FIG. 2 is a schematic diagram of an axial fan according to one embodiment of the disclosure.
Figure 3:
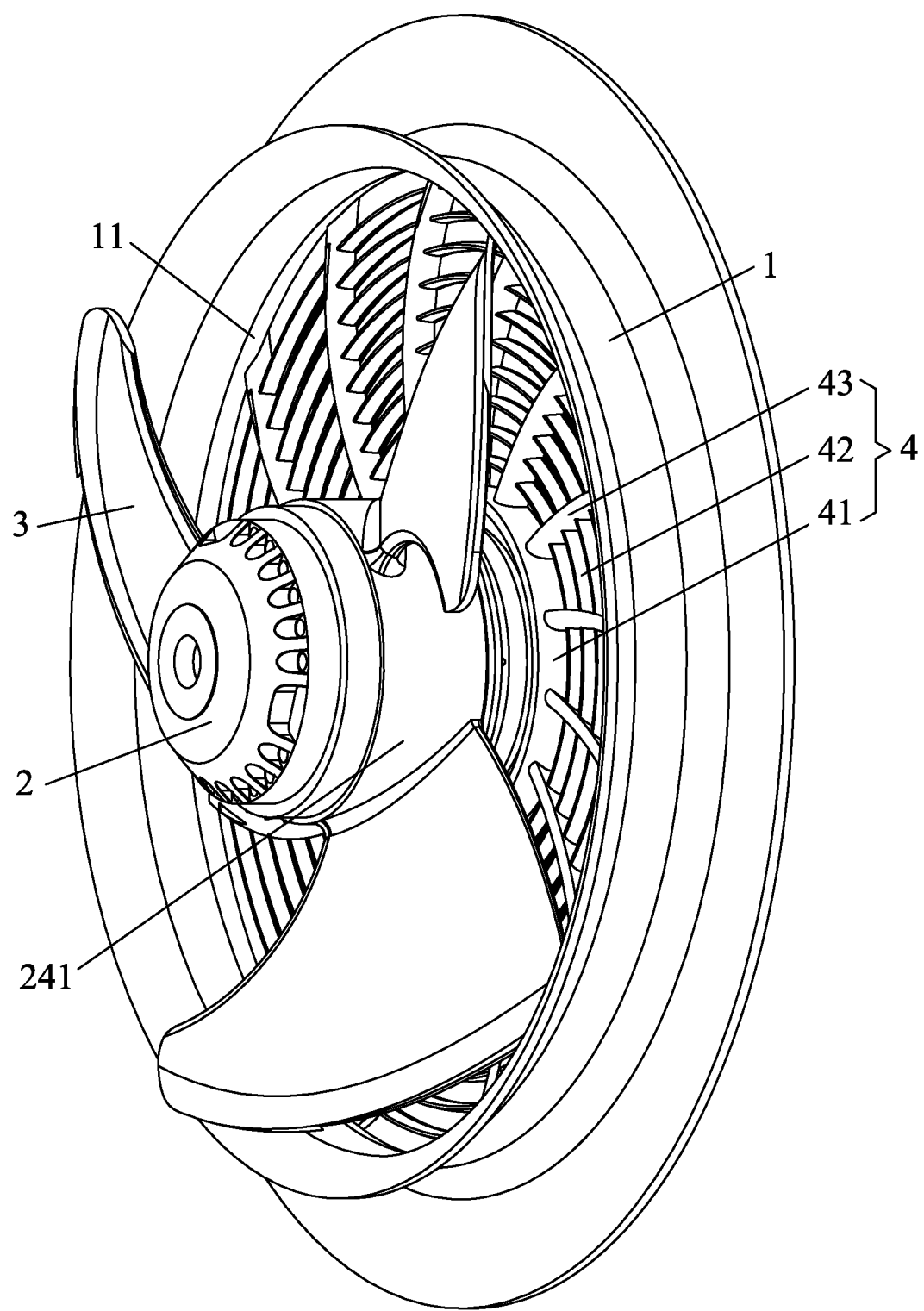
FIG. 3 is another schematic diagram of an axial fan according to one embodiment of the disclosure.
Figure 4:
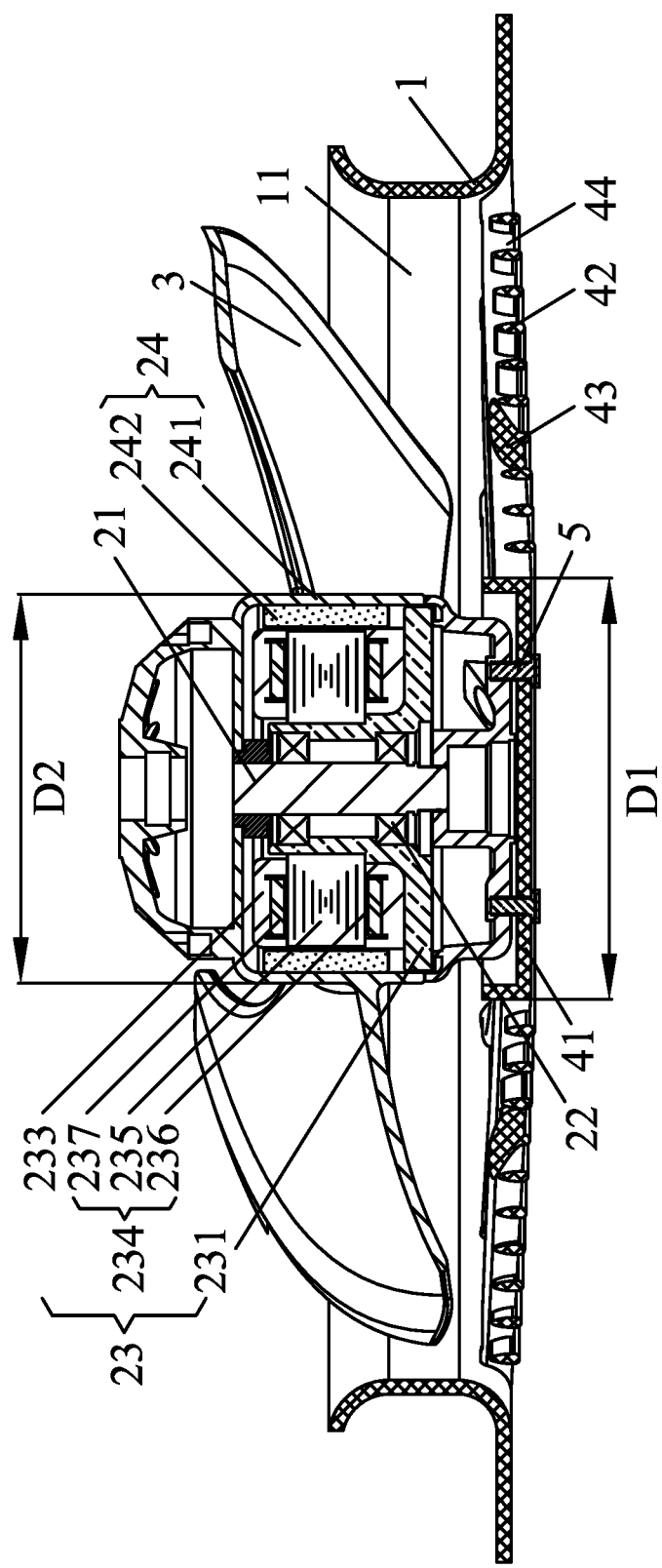
FIG. 4 is a sectional view of an axial fan according to one embodiment of the disclosure.
Figure 5:
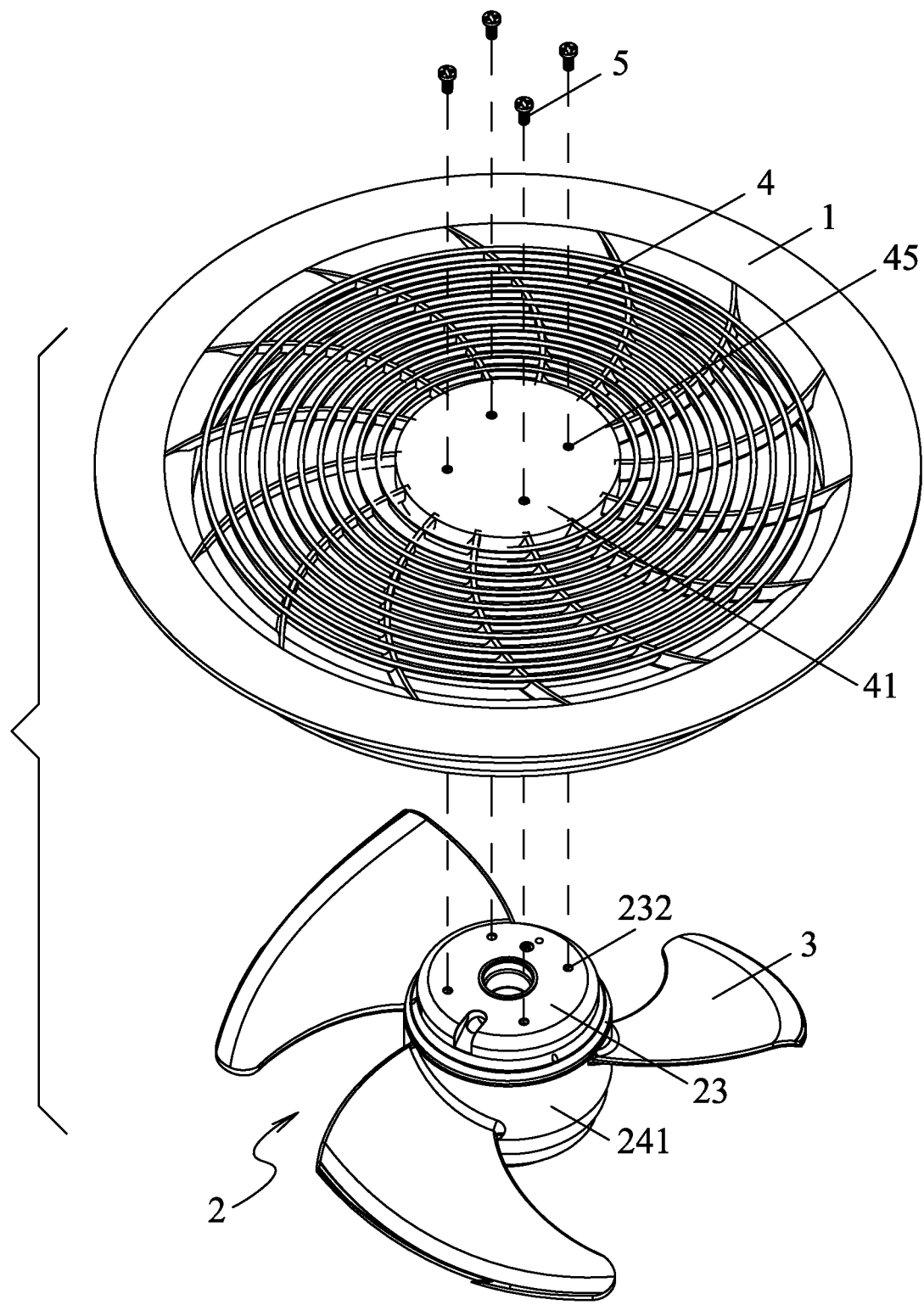
FIG. 5 is an exploded view of an axial fan according to one embodiment of the disclosure.

As shown in FIGS. 2-5, an axial fan comprises a wind deflector 1 comprising a cavity 11; a motor 2; a plurality of blades 3 circumferentially disposed on the motor; and a grid mesh 4 disposed on one end face of the wind deflector 1. The motor 2 and the plurality of blades 3 are disposed in the cavity 11; and the grid mesh 4 comprises a central part provided with a fixed platform 41, and the motor is disposed on the fixed platform 41.

The motor 2 comprises a shaft 21, a bearing 22, a plastic encapsulated stator 23 and an outer rotor 24; the plastic encapsulated stator 23 comprises a sleeve seat 231; the shaft 21 is disposed on the sleeve seat 231 via the bearing 22; the outer rotor 24 is disposed outside the plastic encapsulated stator 23; the outer rotor 24 comprises a casing 241 and a permanent magnet 242 disposed in the casing 241; one end of the shaft 21 extends out of the sleeve seat 231 and is connected to the casing 241, and the plurality of blades 3 is circumferentially disposed on the casing 241.

The plurality of blades 3 is integrated with the casing 241 through injection molding.

The plastic encapsulated stator comprises an end face provided with a plurality of screw holes 232; the fixed platform 41 comprises a plurality of mounting holes 45 matching the plurality of screw holes 232, respectively; a plurality of bolts respectively passes through the plurality of mounting holes 45 and the plurality of screw holes 232 to fix the motor 2 on the fixed platform 41.

The grid mesh 4 further comprises a plurality of annular bars 42 and a plurality of connection ribs 43; the grid mesh 4 covers an air outlet on the one end face of the wind deflector 1 and is integrated with the wind deflector 1 through injection molding; the plurality of annular bars 42 arranges to form a plurality of concentric circles surrounding the fixed platform 41; every two adjacent concentric circles are connected to each other by the plurality of connection ribs 43; one end of each of the plurality of connection ribs 43 is connected to the wind deflector 1, and another end of each of the plurality of connection ribs 43 is connected to the fixed platform 41; adjacent annular bars 42 and adjacent connection ribs 43 form a plurality of ventilation slots 44.

The fixed platform 41 is circular, and a diameter of the fixed platform 41 is larger than that of the casing 241.

The plurality of mounting holes 45 is tapped holes.

The disclosure also provides a vehicle comprising the axial fan.

Compared with conventional axial fans having a support for fixing the motor, the axial fan of the disclosure has a relatively small thickness, and the volume of the axial fan is reduced, thus improving the loading quantity of the axial fan for each container, reducing the transport cost. In addition, the axial fan of the disclosure has less components than a conventional axial fan, which can improve the assembly efficiency of the axial fan.

It will be obvious to those skilled in the art that changes and modifications may be made, and therefore, the aim in the appended claims is to cover all such changes and modifications.

What is claimed is:

1. A device, comprising:
   1) a wind deflector comprising a cavity;
   2) a motor;
   3) a plurality of blades circumferentially disposed on the motor; and
   4) a grid mesh disposed on one end face of the wind deflector;

wherein:
   the motor and the plurality of blades are disposed in the cavity;
   the grid mesh comprises a central part provided with a fixed platform, and the motor is disposed on the fixed platform;
   the motor comprises a shaft, a bearing, a plastic encapsulated stator and an outer rotor; the plastic encapsulated stator comprises a sleeve seat; the shaft is disposed on the sleeve seat via the bearing; the outer rotor is disposed outside the plastic encapsulated stator; the outer rotor comprises a casing and a permanent magnet disposed in the casing; one end of the shaft extends out of the sleeve seat and is connected to the casing, and the plurality of blades are circumferentially disposed on the casing;
   the grid mesh further comprises a plurality of annular bars and a plurality of connection ribs; the grid mesh covers an air outlet on the one end face of the wind deflector and is integrated with the wind deflector through injection molding; the plurality of annular bars is arranged to form a plurality of concentric circles surrounding the fixed platform; every two adjacent concentric circles are connected to each other by the plurality of connection ribs; one end of each of the plurality of connection ribs is connected to the wind deflector, and another end of each of the plurality of connection ribs is connected to the fixed platform;
   adjacent annular bars and adjacent connection ribs form a plurality of ventilation slots; and
   the fixed platform is circular, and a diameter of the fixed platform is larger than that of the casing.

2. The device of claim 1, wherein the plurality of blades are injection molded with the casing.

3. The device of claim 1, wherein the plastic encapsulated stator comprises an end face provided with a plurality of screw holes; the fixed platform comprises a plurality of mounting holes matching the plurality of screw holes, respectively; a plurality of bolts respectively passes through the plurality of mounting holes and the plurality of screw holes to fix the motor on the fixed platform.

4. The device of claim 3, wherein the plurality of mounting holes are tapped holes.

5. A vehicle, comprising the device of claim 1.

* * * * *